United States Patent [19]

Svendsen

[11] 3,753,138

[45] Aug. 14, 1973

[54] AMPLIFIER SYSTEM WITH CONTINUOUSLY VARIABLE SUPPLY

[75] Inventor: Gordon D. Svendsen, San Carlos, Calif.

[73] Assignee: Ampex Corporation, Redwood City, Calif.

[22] Filed: June 3, 1971

[21] Appl. No.: 149,497

[52] U.S. Cl. .................. 330/30 R, 330/40, 330/124

[51] Int. Cl. .............................................. H03f 3/68

[58] Field of Search ...................... 330/22, 40, 30 R, 330/123, 128, 124 R

[56] References Cited

UNITED STATES PATENTS

| | | | |
|---|---|---|---|
| 3,426,290 | 2/1969 | Jensen | 330/40 |
| 3,483,425 | 12/1969 | Yanisshevsky | 330/40 UX |
| 3,319,175 | 5/1967 | Dryden | 330/22 |

*Primary Examiner*—Roy Lake
*Assistant Examiner*—James B. Mullins
*Attorney*—Robert G. Clay

[57] ABSTRACT

A voltage comparator compares the operating voltage provided to a power amplifier to a voltage representative of that appearing across a load. A unity gain linear amplifier is coupled between a voltage source and the power amplifier that is responsive to the voltage comparator to maintain the operating voltage provided to the power amplifier sufficient to deliver the required current to the load.

9 Claims, 3 Drawing Figures

INVENTOR.
GORDON D. SVENDSEN

BY Ralph L. Masino

ATTORNEY

AMPLIFIER SYSTEM WITH CONTINUOUSLY VARIABLE SUPPLY

FIELD OF THE INVENTION

The present invention relates to amplifier systems. More particularly, it relates to amplifier systems, including variable operating voltage supplies, for driving loads.

BACKGROUND OF INVENTION

The ability to drive a load is limited by the power a drive is able to deliver. For example, in some cases the load is variable and, as it changes, different levels of current are required to be delivered by the driver. Often, the ability of the driver to supply the required current is limited by the operating voltage being provided to the driver. For example, as the speed of a variable speed direct current (D.C.) motor is increased the back electromotive force (emf) generated by the motor increases. When the back emf becomes about equal to the operating voltage supplied to the motor drive amplifier, the amplifier is unable to supply additional current. This limits the maximum speed of the motor.

Similar limitations are encountered in signal systems including inductively or capacitively reactive loads for processing signals of different frequencies. In these systems, it is generally desirable to maintain the current delivered to the reactive load constant at all signal frequencies. However, such constant current operations are accompanied with changes in the voltage across the reactive load. In an inductive load, increasing signal frequencies produce larger voltages across the load for a constant load current condition. In a capacitive load, decreasing signal frequencies are accompanied by larger load voltages. When the voltage called for across the load is greater than the operating voltage supplied to the load's driver, the driver will saturate. When saturated, the driver is operated outside of its active operating region and, hence is unable to exercise control over the signal conditions at its load. This limits the control range of the driver.

In amplifier systems, the range of input signal amplitude excursions also is limited by the amplifier's operating voltage, particularly, if the amplifier system is to handle both low and high level signals. Excessive excursions can cause the amplifier to saturate, thereby, introducing signal distortions.

If a fixed operating voltage is provided to the driver which is of a magnitude that enables the driver to supply the current demanded by the load while operating within its active operating region, the driver is required to dissipate large amounts of power. This is very inefficient.

To minimize the unnecessary power dissipation while operating the driver within its active operating region, it has been the practice to step incrementally the operating voltage supplied to drivers. However, as the operating voltage is stepped to higher voltages, the driver initially will dissipate a significant amount of power, particularly, in motor drive applications where lower speed operations are accompanied by larger currents being delivered to the load. In high power systems expensive heat sinks are usually provided to dissipate this power. Also, expensive protection circuits are often required to prevent sudden surges of damaging currents that may accompany such stepping of the operating voltage. Although such drivers and associated switched supplies are more efficient and are protected against damaging surges of current, the switching devices generate radio frequence (rf) interference noise, which for some applications is very objectionable.

Therefore, considerable advantage is to be gained by efficiently extending over a large range the active operating region of an amplifier. Additional advantages are to be gained by controlling the operating voltage supply of an amplifier so that it efficiently delivers the required drive to a load without consuming significant amounts of power under any load or signal input conditions.

SUMMARY OF THE INVENTION

Accordingly, it is an object of the present invention to maintain an amplifier in its active operating region for all expected load state conditions.

More particularly, it is an object of the present invention to improve the power delivery efficiency of an amplifier operated under varying load conditions.

Another object of the present invention is to minimize the power dissipated by an amplifier required to deliver a wide range of power to a load.

Still another object of the present invention is to change the operating voltage of an amplifier without introducing rf interference.

A further object of the present invention is to maintain the operating voltage of an amplifier greater than the voltage appearing across its load.

Yet another object of the present invention is to maintain the operating voltage of a motor drive amplifier sufficiently greater than the back emf developed by a motor whereby sufficient power is delivered to the motor under all speeds of operation.

Still a further object of the present invention is to change the operating voltage of a D.C. motor drive amplifier in direct proportion to changes in the back emf exceeding a nominal value developed by the driven motor whereby the operating voltage is always maintained somewhat greater than the developed back emf.

Yet it is a further object of the present invention to increase in a continuous fashion the operating voltage of an amplifier to maintain it somewhat greater than the voltage required across the load under varying load conditions.

Still it is another object of the present invention to enable changing, over a wide range, the speed at which a magnetic recording medium is transported without dissipating significant amounts of power in the medium's drive system.

Furthermore, it is an object of the present invention to obviate the necessity of expensive heat sinks and protective circuitry in power amplifier systems employed to drive loads under varying power requirement conditions.

To provide an efficient and inexpensive amplifier system for driving loads under varying signal conditions, the present invention includes means operatively connected to the load to provide a signal representative of the voltage appearing across the load. This signal is compared to a signal representative of the operating voltage of the amplifier driving the load. When the load voltage exceeds a nominal level approaching, although somewhat less than, the operating voltage, a power supply means is activated in response to the comparison to provide power to the amplifier at higher operating voltages. The power supply is activated to increase the operating voltage provided to the amplifier in a continuous or analog fashion and maintain the operating voltage a fixed amount above the load voltage as it increases above the nominal level.

By increasing the operating voltage in a continuous fashion, the driving amplifier can be maintained in its active operating region without the accompanying rf interference characteristic of switching type systems heretofore employed to incrementally step the operating voltage to higher levels. Also, this manner of increasing the operating voltage in a continuous fashion provides more efficient operation, particularly, at the increasing operating voltage ranges.

BRIEF DESCRIPTION OF DRAWINGS

The foregoing and other advantages and features of the present invention will become more apparent from the following description and claims considered together with the accompanying drawing of which:

DESCRIPTION OF PREFERRED EMBODIMENTS

Figures 1, 2, 3:
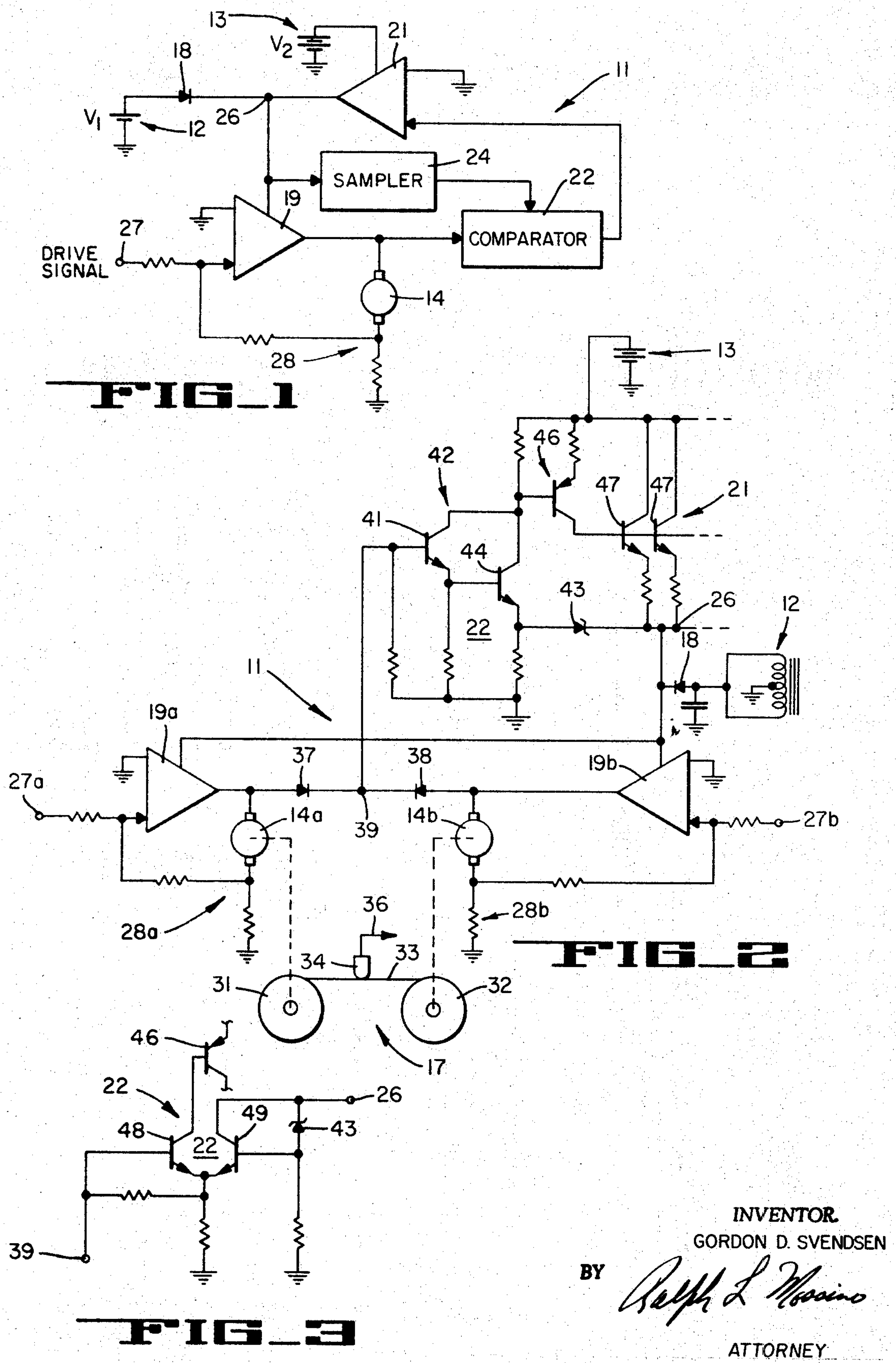
FIG. 1 is a schematic block diagram of the amplifier system of the present invention.
FIG. 2 is a schematic circuit diagram of one embodiment of the amplifier system of the present invention.
FIG. 3 is a partial schematic circuit diagram illustrating another embodiment of the amplifier system of the present invention.

Referring to FIG. 1, the amplifier system 11 of the present invention includes two supplies 12 and 13 providing power at different voltages, $V_1$ and $V_2$. In one application, the amplifier system 11 is employed to provide drive to variable speed D.C. motors 14*a* and 14*b* of a magnetic tape transport 17 (see FIG. 2). In this application, the voltage, $V_2$, provided by the supply 13 is two times the voltage, $V_1$, provided by the supply 12. The lower voltage supply 12 is connected through an isolation diode 18 to a drive amplifier circuit 19 and provides the operating voltage to the amplifier while the amplifier's load requirements are within the active operating region of the amplifier 19. The higher voltage supply 13 is also connected to the drive amplifier 19 through a unity gain linear booster power amplifier circuit 21. The isolation diode 18 serves to isolate the two supplies 12 and 13 from each other. The booster power amplifier circuit 21 is aranged so that when the load requirements are within a selected range of the active operating region of the drive amplifier 19 when receiving its operating voltage from the supply 12, the booster amplifier 21 is in its "off" state. However, when the load voltage exceeds a nominal level somewhat less than the voltage, $V_1$, provided by the supply 12, the booster power amplifier 21 is activated to deliver power from the higher voltage supply 13 at an increased operating voltage level. As the load voltage increases above the nominal level, the booster power amplifier 21 operates to increase the operating voltage provided to the drive amplifier 19 in an analog fashion to maintain the operating voltage at a constant level above the increasing load voltage.

To activate the booster power amplifier 21 to increase the operating voltage provided to the drive amplifier 19, a comparator 22 is coupled to receive a signal representative of the load voltage, e.g., the back emf of a varaible speed D.C. motor 14. The comparator 22 compares this signal to a signal representative of the drive amplifier's operating voltage provided by the sampler 24. Whenever the back emf of the motor 14 exceeds a nominal value somewhat less than the operating voltage of the drive amplifier 19 established by the supply 12, the comparator issues a control signal, which activates the booster power amplifier 21. The activated booster amplifier 21 couples the higher voltage supply 13 in circuit with the drive amplifier 19 to provide a higher operating voltage to the drive amplifier. Since a higher voltage is established at the junction 26, the isolation diode 18 is reversed biased and the lower voltage supply 12, thereby disconnected from the drive amplifier 19. With the establishment of the higher operating voltage, the drive amplifier 19 is able to supply additional current to the motor 14.

If the back emf of the motor 14 increases still further, the comparator 22 operates to provide a control signal to the booster amplifier circuit 21 that is productive of increasing the operating voltage a corresponding amount until the limit of the higher voltage supply 13 is reached. While only a single higher voltage supply 13 is shown in FIG. 1, additional separate supplies together with associated booster power amplifiers may be connected through appropriate isolation devices at the junction 26 to form the amplifier system 11. In this manner, the drive amplifier 19 can be arranged to deliver power extremely efficiently over a wide power range within power ratings of the amplifying element. The voltage level of the highest voltage source is selected to be sufficient to allow the drive amplifier 19 to deliver the highest power to be required by the load.

The amplifier system 11 of the present invention has been generally described as employed in a variable speed D.C. motor drive system. In such applictions, a power amplifying device is employed as the motor drive amplifier 19. The drive signal coupled to the input terminal 27 of the drive amplifier 19 determines the operating speed of the motor 14. As drive signals are received to increase the speed of the motor 14, the developed back emf becomes greater and the current supplied by the drive amplifier 19 decreases. When the back emf becomes equal to the operating voltage of the drive amplifier 19, the amplifier is no longer able to deliver current to the motor 14. The operation of the power amplifier circuit 21 in increasing the operating voltage provided to the drive amplifier 19 returns the amplifier 19 to its active operating region, enabling it to supply the current necessary to drive the motor 14 at higher speeds. This facilitates retaining servo control over the operation of the motor 14. With the addition of the negative feedback gain stabilizing circuit 28, the speed of the motor 14 can be precisely controlled over a wide range of operating speeds.

At low motor speeds, the back emf developed by the motor 14 is lowest and the current supplied, hence, power dissipated by the drive amplifier is highest. However, in the amplifier system 11 of the present invention, the lowest operating voltage is provided to the drive amplifier circuit 19 during these high power, low speed motor operations. Therefore, although the amplifier system 11 is able to provide large amounts of power for high speed motor operations, this is achieved with low levels of power dissipation in the drive amplifier 19. Thus, the amplifier system 11 of the present invention is an efficient and inexpensive power delivery system able to deliver a wide range of power without accompanying rf interferences common in similar systems employing switching devices.

FIG. 2 illustrates an embodiment of the amplifier system 11 of the present invention arranged to drive two reel drive motors 14*a* and 14*b* of a magnetic tape transport 17. In this application, the motor 14*a* is coupled to drive a supply reel 31 in one direction and the motor 14*b* is coupled to drive a take-up reel 32 in the opposite direction. The amplifier system 11 supplies motor drive signals to the motors according to the direction the magnetic tape 33 is to be advanced for positioning or transduction with the magnetic head 34. Suitable record and reproduce electronics (not shown) are coupled to the magnetic head 34 by the signal line 36 to effect the transduction of information with the magnetic tape 33.

Each of the motors 14*a* and 14*b* is coupled to a drive amplifier circuit 19, motor 14*a* to the drive amplifier circuit 19*a* and motor 14*b* to the drive amplifier circuit 19*b*. The lowest voltage supply 12 provides the operating voltages for both drive amplifiers 19*a* and 19*b*. The higher voltage supply 13 also provides the higher operating voltages for both drive amplifiers 19*a* and 19*b*. This embodiment of the amplifier system 11 is arranged so that the motor 14*a* or 14*b* requiring the highest voltage commands the operating voltages provided to both drive amplifier 19*a* and 19*b*.

To control the operating voltages provided to the drive amplifiers 19*a* and 19*b*, each of the motors 14*a* and 14*b* has its armature windings coupled through one of the isolation diodes 37 and 38, respectively, to a common junction 39. Each of the isolation diodes 37 and 38 (or plurality of serially connected diodes in place of each) must be able to withstand a reverse bias equal to the highest back emf voltage developed by the motors 14*a* or 14*b*. The common junction 39 is connected to the base electrode of the input transistor 41 of a unity gain transistor current amplifier circuit 42 in the form of a two-stage Darlington connection. The current amplifier circuit 42 compares the highest back emf being developed by the motors 14*a* and 14*b* to the fixed nominal operating voltage provided by the lower voltage supply 12. The comparison is achieved by the operation of a Zener diode 43 connected between the emitter electrode of the output transistor 44 of the two-state Darlington current amplifier circuit 42 and the junction 26 at the output of the lower voltage supply 12. The Zener diode 43 operates with the current amplifier circuit 42 and the booster power amplifier circuit 21 to maintain the voltage at the junction 26 a fixed amount above the highest emf being developed by the motors 14*a* or 14*b* whenever the highest emf exceeds a selected nominal level somewhat below (e.g., about 25 percent) the voltage being provided by the lower voltage supply 12.

The collector electrode of the output transistor 44 of the current amplifier circuit 42 is connected to the base circuit of a transistor driver 46. Whenever the back emf exceeds the selected nominal level, the current drawn by the current amplifier circuit 42 increases the base current provided to the transistor driver 46. The emitter electrode of the transistor driver 46 is coupled to the higher voltage supply 13 and its collector electrode is directly connected to the base electrode of one or more parallelly connected unity gain transistor power amplifiers 47 forming the booster power amplifier circuit 21. The number of power amplifiers 47 employed is determined by the maximum current to be delivered to the motors 14a and 14*b*. The collector electrode of each of the transistor power amplifiers 47 is connected directly to higher voltage supply 13 and the emitter electrode is connected through a resistor to the junction 26 at the output of the lower voltage supply 12.

As the base current of the transistor driver 46 increases, the driver 46 causes the transistor booster amplifiers 47 to conduct more current. Through the operation of the Zener diode 43 and driver 46, the booster amplifiers 47 will conduct as required to maintain the voltage provided at the junction 26, hence, the operating voltage of the motor drive amplifier circuits 19*a* and 19*b*, higher than the highest back emf being developed by the motors 14*a* or 14*b*. As the speed of one of the motors 14*a* or 14*b* is increased above that which develops the selected nominal level of back emf, the voltage at the emitter electrode of the output transistor 44 of the current amplifier circuit 42 increases. The voltage at junction 26 also increases to be maintained a fixed amount above the emitter voltage determined by the voltage across the Zener diode 43. If silicon type Zener diodes are employed, the voltage at junction 26 will be 4 to 6 volts higher than the voltage at the emitter electrode of transistor 44, hence, at the junction 39. This voltage at the junction 26 will be about equal to the highest back emf being developed by the motors 14*a* or 14*b*, the circuit voltage drops, such as across one of the diodes 37 and 38, accounting for the difference between the voltage at the base of the input transistor 41 of the current amplifier circuit 42 and the back emf of the motor.

FIG. 3 illustrates another type of comparator 22 that can be employed with the booster power amplifier circuit 21, such as illustrated in FIG. 2. In this embodiment, two transisors 48 and 49 are connected in the form a difference amplifier circuit to replace the unity gain transistor current amplifier circuit 42 in the embodiment of FIG. 2. The base electrode of the transistor 48 is connected to the common junction 39 of the diodes 37 and 38 (see FIG. 2). The transistor 48 compares the voltage at the junction 39 to a voltage representative of the operating voltage being provided to the drive amplifier circuits 19a and 19b at junction 26 and established at the base electrode of the other transistor 49 of the difference amplifier. As in the comparator circuit employed in the embodiment of FIG. 2, the Zener diode 43 establishes the changing reference against which the back emf related voltage is compared. The collector electrode of transistor 48 is connected to the base electrode of the transistor driver 46 to operate the booster power amplifier circuit 21 in the same fashion as it is in the embodiment of FIG. 2.

The amplifier system 11 of the present invention has been described as employed to control operating voltage provided to a single or two amplifier circuits, each driving a load such as a variable speed D.C. motor. However, the amplifier system 11 may include more than two drive amplifiers, each driving a load. If additional drive amplifiers are included, they would be coupled to the junction 26 to receive their operating voltages in the manner illustrated by drive amplifiers 19*a* and 19*b* in FIG. 2. The loads of such additional amplifiers would be coupled to the junction 39 through suitable isolation devices.

While the amplifier system 11 of the present invention has been described in detail as employed to control power amplifier circuits, the amplifier system can be arranged to control voltage amplifier circuits employed to process both low and high level signal voltages. In these applications, the load of the voltage amplifier circuit is detected and the operating voltage of the amplifier circuit adjusted to maintain a distortion free output over the entire range of low and high level signal voltages.

What is claimed is:

1. An amplifier system for driving loads comprising:
   an amplifier circuit coupled to provide power to a load;
   means coupled to provide a first level of operating voltage to said amplifier circuit;
   means for providing a continuous range of voltages for operating said amplifier circuit at voltage levels higher than said first level;
   means coupled to said amplifier circuit and responsive thereto to provide a first signal representative of the operating voltage of said amplifier circuit;
   means coupled to said load and responsive thereto to provide a second signal representative of the voltage across said load;
   a voltage comparator coupled to compare said first signal and said second signal and provide a control signal whenever the voltage across the load exceeds that which is a selected amount less than the operating voltage of the amplifier circuit; and
   a booster power amplifier circuit in circuit with the means for providing the continuous range of operating voltages and the amplifier circuit and responsive to the control signal to couple to the amplifier circuit an operating voltage within said continuous range of operating voltages to maintain the operating voltage of said amplifier circuit greater than the voltage across the load by said selected amount.

2. The amplifier system according to claim 1 wherein the voltage comparator includes a unity gain current amplifier circuit having first and second control electrodes and an output electrode, the first control electrode is coupled to receive the first signal and the second control electrode is coupled to receive the second signal, said unity gain current amplifier circuit is responsive to the first and second signals to increase proportionately the current in the circuit of the output electrode when the voltage across the load exceeds that which is the selected amount less than the operating voltage of the amplifier circuit, the booster power amplifier circuit is responsive to the increase in current to increase the operating voltage provided to the amplifier circuit.

3. The amplifier system according to claim 1 wherein the voltage comparator includes a difference amplifier circuit having first and second stages, each stage includes a control electrode and an output electrode, the control electrode of the first stage is coupled to receive the first signal, the control electrode of the second stage is coupled to receive the second signal, said differential amplifier circuit responsive to the first and second signals to provide the control signal at the output electrode of the first stage, the output electrode is coupled to provide the control signal to the booster power amplifier circuit.

4. The amplifier system according to claim 1 for driving a plurality of loads wherein a separate amplifier circuit is provided for each of said loads, each of said separate amplifiers coupled to a first common junction to receive the same operating voltage, and further including a unidirectional conducting signal isolation means connected between each load and a second common junction, each signal isolation means poled to conduct from the load to the second junction, said second junction connected to provide first signals to the voltage comparator.

5. The amplifier system according to claim 6 wherein said means providing a first level of operating voltage and said means for providing the continuous range of operating voltages are coupled to said first common junction with said first level means electrically isolated from said continuous range means.

6. The amplifier system according to claim 12 further comprising a switch means for coupling to the first common junction the means providing the first level of operating voltage, said switch means operative to couple the first level of operating voltage to said first common junction when the voltage across the load is less than a nominal value which is the selected amount less than said first level of operating voltage, said switch means responsive to the voltage across the load exceeding the nominal value to decouple from said first common junction said means providing the first level of operating voltage.

7. The amplifier system according to claim 6 wherein the voltage comparator provides the control signal whenever the voltage across one of the plurality of loads coupled to the second common junction exceeds that which is the selected amount less than the operating voltage of the amplifier circuit of the said one of the loads.

8. The amplifier system according to claim 1 further comprising a switch means for coupling to the amplifier circuit the means providing the first level of operating voltage, said switch means operative to couple the first level of operating voltage to said amplifier circuit when the voltage across the load is less than a nominal value which is the selected amount less than said first level of operating voltage, said switch means responsive to the voltage across the load exceeding the nominal value to decouple from the amplifier circuit said means providing the first level of operating voltage.

9. The amplifier system according to claim 11 wherein the voltage which is the selected amount less than the operating voltage provided to the amplifier circuit is selected to maintain the amplifier circuit within its active operating region while the voltage across the load is less than the highest voltage of the continuous range of voltages.

* * * * *